US005516539A

United States Patent [19]
Walsh et al.

[11] Patent Number: 5,516,539
[45] Date of Patent: May 14, 1996

[54] METHOD FOR SHIPMENT AND RIPENING OF PEACHES, NECTARINES & PLUMS

[75] Inventors: Christopher S. Walsh, University Park; Donald Schlimme, College Park, both of Md.; Luis E. Luchsinger, Santiago, Chile

[73] Assignee: University of Maryland, College Park, College Park, Md.

[21] Appl. No.: 383,150

[22] Filed: Feb. 3, 1995

[51] Int. Cl.⁶ ................................................. A23B 7/152
[52] U.S. Cl. .................. 426/231; 426/312; 426/316; 426/324; 426/327; 426/393; 426/419; 426/442; 426/268
[58] Field of Search ................................ 426/231, 232, 426/312, 316, 324, 327, 392, 393, 419, 442, 524, 263, 268, 270

[56] References Cited

U.S. PATENT DOCUMENTS

| | | | |
|---|---|---|---|
| 3,620,765 | 11/1971 | McDonnell et al. | 426/263 |
| 3,924,010 | 12/1975 | Erb | 426/312 |
| 4,411,921 | 10/1983 | Woodruff | 426/314 X |
| 4,824,685 | 4/1989 | Bianco | 426/419 X |
| 4,842,875 | 6/1989 | Anderson | 426/415 |
| 4,895,729 | 1/1990 | Powrie et al. | 426/316 |
| 5,028,443 | 7/1991 | Wade | 426/312 |
| 5,419,153 | 5/1995 | Hartley | 426/419 X |

OTHER PUBLICATIONS

Varriano–Marston et al, "Controlled Atmosphere Packaging of Produce", 1987 Produce Marketing Almanac, pp. 23–29.
Brecht et al., "Ethylene Production by fruit of Some Slow-–ripening Nectarine Genotypes". J. Amer. Soc. Hort. Sci. 109(6): pp. 763–767, 1984.
Brecht et al, "Description and Postharvest Physiology of Some Slow–ripening Nectarine Genotypes", J. Amer. Soc. Hart. Sci. 109(5):596–600, 1984.
Brecht et al., "Regulation of Ethylene Production by Ripening Nectarine Fruit as Influenced by Ethylene and low Temperature", J. Amer. Soc. Hort. Sci., 109(6):869–872, 1984.
Brecht et al, "Controlled Atmosphere and Ethylene Effect on Quality of California Canning Apricots and Clingstone Peaches", J. Food Sci, 47:432–436, 1982.
Aly et al., "Ethylene Production and Firmness of Peach and nectarines fruits as related to storage", Proc. Fla. State Hort. Soc. 94:291–294, 1981.
Brecht et al., "Ripening and Reduced Ethylene Production by Nectarine Fruits following Exposure to Ethylene", Hort Science, 17(2):224–225, 1982.
Irving, "Transport of Fresh Horticultural Produce under modified Atmospheres", CSIRO Food Res Q, 44(2) 25–33, 1984.
USDA Agriculture Marketing Service, Bull. # 64, "How Fresh Peaches are Marketed" by Gary Rasmussan, Aug. 1978, Washington DC.
CA Tree Fruit Agreement, "Tree Fruit: Ancient Food Adapts to the 80's," School Food Service Journal, vol. 41, No. 6, Jul. 1987, pp. 86–88.

*Primary Examiner*—Esther M. Kepplinger
*Assistant Examiner*—Milton I. Cano
*Attorney, Agent, or Firm*—Christopher N. Sears

[57] ABSTRACT

The invention herein pertains to a process for improvement of stored fresh market fruits such as peaches, plums and nectarines by retarding mealiness, dryness and internal breakdown. Peaches in particular are routinely stored at 0° C. to prevent softening. Unfortunately, "chilling injury" occurs in peaches, plums and nectarines stored by this conventional technique which can result in insurance claims, litigation and general consumer dissatisfaction. The invention comprises five steps for the transshipment thereof that results in enhanced fruit quality. This process is particularly suitable for imported fruits from overseas where transshipment by boat is required. The process can also be used to improve the quality of domestic fruits held for late-season "market window" sales.

7 Claims, No Drawings

METHOD FOR SHIPMENT AND RIPENING OF PEACHES, NECTARINES & PLUMS

FIELD OF THE INVENTION

This invention pertains to a process for the combined harvest, shipping, handling, ripening and distribution of whole peaches, plums and nectarines for enhancement of fruit quality thereof.

BACKGROUND OF THE INVENTION

Although peaches are grown in temperate climates, they are "chill-sensitive" like tropical fruits. This "chilling injury" results in mealiness, browning and internal breakdown after lengthy storage around 0° C., although recommended by all industry guidelines, for example, see the i) U.S. Department of Agriculture marketing bulletin No.64 entitled "How Fresh Peaches are Marketed," August 1978 and ii)the *School Food Journal's* June/July 1987 edition entitled "Tree Fruit: Ancient Food Adapts to the 80's". Previous attempts to store peaches in "controlled atmosphere" have also been unsuccessful. This "chilling injury" is a consequence of low temperature controlled atmosphere storage conditions and long term air storage. In particular, the degradation of fruit quality is induced by long exposure at storage temperatures of less than 8° C.

In view of this problem, the invention herein provides a unique combination of steps for harvesting and post harvest handling of peaches, plums and nectarines that will minimize "chilling injury" and also prolong the shelf life of these fruits.

SUMMARY OF THE INVENTION

The present invention pertains to a process for improvement of stored fresh market peaches and nectarines by retarding mealiness, dryness and internal breakdown. Peaches are routinely stored at 0° C. to prevent softening. Unfortunately, "chilling injury" occurs in peaches, plums and nectarines stored by this conventional technique can result in unwanted insurance claims, litigation and consumer dissatisfaction. The invention process herein consists of five sequential steps for enhancing quality of these fruits. The process is particularly suitable for imported fruit from overseas where marine transport is required. The invention herein will improve the quality of domestic fruits produced in the U.S. held for late-season "market window" sales.

Accordingly, an object of the present invention is to provide an integrated process of harvesting, shipping, handling, and distribution of peaches, nectarines and plums in particular as well as other fruits that can use this method. Thus, the invention provides at a supermarket distribution level, fruits having: i) more flavor; ii) less acidity; iii) absence of mealiness and internal browning; and iv) last longer without molding. Still further advantages will become apparent from considering the ensuing detailed description.

DETAILED DESCRIPTION

The following consecutive five steps describes the process for shipment of peaches, nectarines and plums in particular:

Stage 1: Maturity: The fruit should be harvested early-mature. A Minolta® colorimeter "a" value of −8 or greener is required. This ensures that low-ethylene evolving fruit results which has a long storage life. This is a critical stage that must be followed. This overall process will not be effective with "late-mature" or "tree-ripe" fruit.

Stage 2: Preshipment Period. Holding the fruit from stage 1 at 0° C. is required. This should be for two weeks or less. The industry well known standard chlorination dip is may also be required during this period to inhibit mold growth, e.g. using standard 100 ppm sodium hypochlorite solution with a pH of 6.0.

Stage 3: Shipment. Shipment at non-chilling temperature of 10° C. in shipboard cargo containers maintained at 3% oxygen with a tolerance of ±1%, and 10% carbon dioxide with a tolerance of ±5% (controlled atmosphere storage). Appropriate devices that can accomplish this task include concepts developed by Anderson's U.S. Pat. No. 4,842,875 entitled "Controlled Atmosphere Package" which is hereby incorporated by reference. This teaching mentions the use of peaches as just one fruit used in the application of this invention; however, the actual $O_2/CO_2$ levels are not the same as required by the instant invention. The effect of low oxygen to reduce ethylene production is minimal at 8% oxygen on peaches. For low oxygen levels to be effective to bring about lower ethylene levels and thus ripening, the oxygen levels must be below 5%. The instant invention reduces the oxygen levels around 3% to retard the ripening process.

Additionally, U.S. Pat. No. 4,411,921 by Woodruff entitled "Method for Inhibiting Fungal Growth on Fresh Fruits and Vegetables" teaches of using $O_2/CO_2/CO$ as a mixture for the shipment of fruits and vegetables in general, with peaches and nectarines as examples. However, this patent does not teach of: i) the critical time the peaches and nectarines must be picked as in the instant invention, ii) the lack of needing carbon monoxide (CO) in the shipment of fruit as by the instant invention, CO is a highly toxic agent and should be avoided in containers and iii) avoiding chilling temperatures to fruits during shipment.

Other preferred container storage are ocean-going tractor trailer containers with atmospheric control capability to maintain these $O_2/CO_2$ levels. Additionally, an ethylene scrubber unit is a preferable add-on device to the container to maintain the ethylene content in the container not greater than 50 parts per billion to retard ripening of the fruit. This maintains the firmness of the fruit while in transit.

Stage 4: Ethylene Treatment. Post-shipping exposure at the port-of-entry of-entry to ethylene gas in a "ripening room" to remove excess acidity in fruit and stimulate volatile aroma production. Exposure to a concentration of ethylene greater than 10 parts per million for between 4 to 24 hours is required. This step is illustrated in Erb's U.S. Pat. No. 3,924,010 entitled "Method for Ripening Fruit in Atmosphere of Ethylene and Carbon Dioxide" which is hereby incorporated by reference. This reference provides detail as to the apparatus and ethylene treatment technique of ripening fruit in general, but does not use the same quantities of ethylene as in the instant invention.

Stage 5: Post-shipping period. Deliver from the port-of entry to the consumer within 2 weeks using normal temperatures 0° C. (32° F.) and ambient atmospheric conditions. This fruit can be handled normally by local freight and warehouse operations receiving treated fruit while avoiding "chilling injury" that can occur after 17 days at 0° C.

Test Results:
LORING PEACHES STORAGE STUDY AT 10° C.
At harvest, the mean fruit weight was 161.2 grams.
The Hunter "a" value measured with a
Minolta ® Colorimeter was −12.0.
Storage Treatment

| Storage Days | 10° C. in Air | | 10° C. in 3% $O_2$ and 10% $CO_2$ | |
|---|---|---|---|---|
| | Ethylene (µl/kg-hr) | Firmness (kg force) | Ethylene (µl/kg-hr) | Firmness (kg force) |
| 0 | — | 7.0 | — | 7.0 |
| 4 | 0.32 | — | 0.13 | — |
| 12 | 2.38 | — | 0.36 | — |
| 16 | 10.68 | 0.67 | 0.32 | 1.10 |
| 15 | 24.10 | — | 0.52 | — |
| 25 | 273.52 | — | 1.12 | — |
| 32 | 395.93 | — | 1.43 | — |
| 34 | 359.26 | 0.62 | 1.41 | 0.80 |
| 43* | 469.55 | — | 3.42 | — |
| 50** | 505.66 | 0.20 | 9.79 | 0.31 |

*External mold (Penicillium spp.) present on air stored fruit.
**External mold (Penicillium spp.) present on 3% oxygen, 10% carbon dioxide stored fruit.
***Fruit quality measurements of ethylene produced by peaches are reported in microliters (µl) per kilogram hour (µl/kg-hr). Fruit firmness (kg force) was measured by an Effegi penetrometer rifted with the appropriate tip for peaches. Fruit was removed from respirometer jars on the dates noted. They were then placed in air at 20° C. for four days. After that four-day period firmness measurements were taken.
Since both treatments were given at 10° C. fruits were juicy; no mealiness was detected in the fruit.

At about day 16, standard storage techniques of the peaches become overly ripe and senescent whereas using the instant five stage method of the invention delayed such occurrence until about day 50, thus a threefold increase in allowable storage time.

Alternative ways of doing major stages 2, 3, and 4 above can vary the maturity of peaches, plums and nectarines. In particular, temperature ranges of stage 2 of this concept can be varied to prevent softening without risking "chilling injury" by holding the temperature at 8° C. (47° F.). As to stage 3 above, lower levels of oxygen and higher levels of carbon dioxide can be effective to avoid damage to the fruits shipped. Moreover, ethylene sampling of the fruit at the port of entry can be performed to determine whether stage 4 is required and estimate "shelf life" of the fruits at the port of entry.

Although the description above contains many specificities, these should not be construed as limiting the scope of this invention as set forth in the appended claims, but as merely providing illustration of the presently preferred embodiment of this invention.

We claim:

1. An integrated method for harvesting, treatment, shipment and ripening of fruits selected from the group consisting of peaches, plums and nectarines comprising the steps of:

(a) harvesting the fruits at an early-mature stage gauged by a colorimeter for measuring an "a" value of −8 or greener of fruit ground color whereby the fruits is in a preclimacteric low-ethylene evolving state before ripening begins;

(b) storing and pretreatment holding of the fruits from step (a) at 0° C. for two weeks or less;

(c) shipping the fruit at non-chilling temperature in controlled atmosphere cargo containers maintained between 2–4% oxygen and 5–15% carbon dioxide thereby maintaining the fruit in a low-ethylene evolving state;

(d) post-shipping exposure at a port-of-entry to ethylene gas in a ripening room at ethylene concentrations between 10–3000 parts per million for between 4 and 24 hours depending upon the fruits ethylene evolving state during this step; and (e) delivering the fruits within 2 weeks from the port-of-entry to consumers at temperatures near 0° C. and atmospheric conditions;

thereby avoiding fruit "chilling injury" while maintaining fruit quality from harvesting to delivery over periods greater than 7 weeks.

2. The method of claim 1 wherein the step (b), the pretreatment process includes a chlorination solution dipping of the fruits to inhibit mold growth, the pH of the solution is about 6.0.

3. The method of claim 2 wherein the step (c), the cargo containers additionally maintain the ethylene concentrations at no greater than 50 parts per billion.

4. The method of claim 2 wherein the step (c), the non-chilling temperatures in the controlled atmosphere cargo containers is about 8–10° C.

5. An integrated method for harvesting, treatment, shipment and ripening of peaches comprising the steps of:

(a) harvesting the peaches at an early-mature stage gauged by a colorimeter for measuring an "a" value of −8 or greener of fruit ground color whereby the peaches are in a preclimacteric low-ethylene evolving state before ripening begins;

(b) storing and pretreatment holding of the peaches from step (a) at 0° C. for two weeks or less;

(c) shipping the peaches at non-chilling temperatures at about 8–10° C. in controlled atmosphere cargo containers that are maintained between 2–4% oxygen and between 5–15% carbon dioxide thereby maintaining the peaches at a low-ethylene evolution state;

(d) post-shipping exposure of the peaches at a port-of-entry to ethylene gas in a ripening room at ethylene concentrations between 10–3000 parts per million from between 4–24 hours depending upon the peaches ethylene evolving state during this step; and (e) delivering within 2 weeks these peaches from the port-of-entry to consumers at temperatures near 0° C. and atmospheric conditions;

thereby avoiding fruit "chilling injury" while maintaining quality of the peaches from harvesting to delivery over periods greater than 7 weeks.

6. The method of claim 5 wherein the step (b), the pretreatment process includes a chlorination solution dipping of the peaches to inhibit mold growth, the pH of the solution is about 6.0.

7. The method of claim 5 wherein the step (c), the cargo containers additionally maintain the ethylene concentrations at no greater than 50 parts per billion.

* * * * *